US012349265B2

(12) United States Patent
Chiou et al.

(10) Patent No.: US 12,349,265 B2
(45) Date of Patent: Jul. 1, 2025

(54) SUPERCONDUCTING ELECTROMAGNET COMPONENT AND ISOCHRONOUS CYCLOTRON INCLUDING THE SAME

(71) Applicant: Heron Neutron Medical Corp., Zhubei (TW)

(72) Inventors: Shan-Haw Chiou, Zhubei (TW); Siao-Cing Liou, Zhubei (TW)

(73) Assignee: HERON NEUTRON MEDICAL CORP., Zhubei (TW)

( * ) Notice: Subject to any disclaimer, the term of this patent is extended or adjusted under 35 U.S.C. 154(b) by 147 days.

(21) Appl. No.: 18/480,171

(22) Filed: Oct. 3, 2023

(65) Prior Publication Data

US 2024/0121880 A1 Apr. 11, 2024

Related U.S. Application Data

(60) Provisional application No. 63/413,790, filed on Oct. 6, 2022.

(51) Int. Cl.
*H05H 7/04* (2006.01)
*H01F 6/06* (2006.01)
*H05H 13/00* (2006.01)

(52) U.S. Cl.
CPC ................ *H05H 7/04* (2013.01); *H01F 6/06* (2013.01); *H05H 13/005* (2013.01); *H05H 2277/11* (2013.01)

(58) Field of Classification Search
CPC .... H05H 7/04; H05H 13/005; H05H 2277/11; H01F 6/06
See application file for complete search history.

(56) References Cited

U.S. PATENT DOCUMENTS 6,683,426 B1 1/2004 Kleeven
10,383,206 B1 8/2019 Nuttens et al.
(Continued)

FOREIGN PATENT DOCUMENTS

CN 107615891 B * 12/2018 ........... A61N 5/1043
CN 107006115 B 6/2019
(Continued)

OTHER PUBLICATIONS

Taiwanese Office Action and Search Report for Taiwanese Application No. 112132055, dated Jun. 25, 2024.
(Continued)

*Primary Examiner* — Adam D Houston
(74) *Attorney, Agent, or Firm* — Birch, Stewart, Kolasch & Birch, LLP

(57) ABSTRACT

A superconducting electromagnet component and an isochronous cyclotron including the same are provided. The superconducting electromagnet component includes a superconducting main coil, a superconducting trim coil group, and a superconducting focusing coil group. The superconducting main coil is disposed around the central axis and includes a median plane. The superconducting trim coil group is disposed in the superconducting main coil around the central axis. The superconducting focusing coil group is disposed on the superconducting trim coil group and includes first focusing coils and second focusing coils. The first focusing coils have a first fan-shaped structure and are disposed side by side around the central axis, and the current directions of two adjacent first focusing coils are opposite. The second focusing coils have a second fan-shaped structure and are correspondingly disposed in the first focusing coils, and the current directions of two adjacent second focusing coils are opposite.

21 Claims, 8 Drawing Sheets

(56) References Cited

U.S. PATENT DOCUMENTS

| | | | | |
|---|---|---|---|---|
| 2014/0371076 | A1 | 12/2014 | Jongen | |
| 2019/0029101 | A1* | 1/2019 | Roecken | A61N 5/1077 |
| 2021/0195726 | A1* | 6/2021 | Leskosek | H05H 9/00 |

FOREIGN PATENT DOCUMENTS

| | | | | | |
|---|---|---|---|---|---|
| CN | 108834300 | B | * | 9/2019 | H05H 13/005 |
| CN | 111408070 | A | * | 7/2020 | A61N 5/10 |
| CN | 109963398 | B | | 11/2020 | |
| CN | 112449476 | A | | 3/2021 | |
| CN | 113260133 | A | | 8/2021 | |
| CN | 117854875 | A | * | 4/2024 | H01F 6/06 |
| CN | 118540844 | A | * | 8/2024 | H05H 13/005 |
| CN | 119565041 | A | * | 3/2025 | |
| EP | 0757256 | A2 | * | 2/1997 | |
| JP | 2010212031 | A | * | 9/2010 | |
| JP | 2011-258427 | A | | 12/2011 | |
| JP | 5524494 | B2 | | 6/2014 | |
| JP | 2015-507332 | A | | 3/2015 | |
| JP | WO2015/045017 | A1 | | 4/2015 | |
| JP | 2018-524764 | A | | 8/2018 | |
| JP | 2019-106366 | A | | 6/2019 | |
| KR | 20180013977 | A | * | 5/2016 | |
| TW | I523585 | B | | 2/2016 | |
| WO | WO-2013113913 | A1 | * | 8/2013 | A61N 5/1077 |

OTHER PUBLICATIONS

Japanese Office Action for Japanese Application No. 2023-173509, dated Jun. 9, 2024, with English translation.

Daniel et al., "Design Status of the Munich Cyclotron Suse", IEEE Transactions on Nuclear Science, vol. 28, No. 3, Jun. 1, 1981, XP-002674347, pp. 2107-2109.

Dey et al., "Design of Ultra-Light Superconducting Proton Cyclotron for Production of Isotopes for Medical Applications", Proceedings of Cyclotrons 2013, Mar. 1, 2014, XP_93128180A, pp. 446-450.

Extended European Search Report for European Application No. 23201672.5, dated Feb. 27, 2024.

Baumgarten, "Cyclotron Beam Extraction by Acceleration", arXiv: 2205.04124v3 [physics.acc-ph] Nov. 10, 2022, pp. 1-11.

D'Agostino et al., "Beam dynamics and space charge studies for the InnovaTron cyclotron", IOP Publishing for Sissa Medialab, Mar. 13, 2023, pp. 1-13.

Kanti Dey et al., "Novel compact superconducting cyclotron for medical applications", Physical Review Special Topics—Accelerators and Beams, vol. 16, No. 040101, 2013, pp. 1-9.

Koay et al., "Beam dynamics and characterization of a new high-intensity compact air-core high temperature superconducting skeleton cyclotron (HTS-SC)", Results in Physics, vol. 33, No. 105090, 2022, pp. 1-12.

* cited by examiner

SUPERCONDUCTING ELECTROMAGNET COMPONENT AND ISOCHRONOUS CYCLOTRON INCLUDING THE SAME

CROSS REFERENCE TO RELATED APPLICATIONS

This application claims the benefit of U.S. Provisional Application No. 63/413,790, filed 06, October 2022, the entirety of which is incorporated by reference herein.

BACKGROUND OF THE INVENTION

Field of the Invention

The present disclosure relates to particle accelerators, and, in particular, it is related to a superconducting electromagnet component and an isochronous cyclotron including the same.

Description of the Related Art

Neutron capture therapy (NCT) is a type of radiation therapy that is carried out by delivering an element with better neutron absorption to a specific location, then performing a selective treatment by using the difference in the degree of neutron absorption of different elements, thereby precisely destroying cancer cells without destroying other healthy tissues.

Specifically, the existing isochronous cyclotron can accelerate a hydrogen ion ($H^-$) beam and use a telescopic device including a carbon foil to strip off the double electrons of the $H^-$ for defining the energy of the proton beam. However, stripping off the double electrons of the $H^-$ will increase the temperature of the carbon foil and the telescopic device. Waiting for the telescopic device and the carbon foil to cool limits the current of the output proton beam. On the other hand, when the current of $H^-$ is too large, the service life of the carbon foil will be shortened accordingly. In other words, the existing design is only suitable for producing isotopes but not for generating proton beams with fixed energy and large current, and is therefore difficult to apply in the field of boron neutron capture therapy (BNCT). Therefore, it is necessary to develop an isochronous cyclotron that can stably supply a proton beam with a large current to facilitate the development and application of neutron capture therapy.

BRIEF SUMMARY OF THE INVENTION

In some embodiments, a superconducting electromagnet component is provided. The superconducting electromagnet component includes a superconducting main coil, a superconducting trim coil group, and a superconducting focusing coil group. The superconducting main coil is disposed around the central axis, wherein the superconducting main coil includes an upper main coil and a lower main coil, and there is a median plane between the upper main coil and the lower main coil for accelerating a particle beam. The superconducting trim coil group is disposed in the superconducting main coil around the central axis. The superconducting trim coil group includes an upper trim coil group and a lower trim coil group, and the median plane is located between the upper trim coil group and the lower trim coil group. The superconducting focusing coil group is disposed on a side of the superconducting trim coil group away from the median plane. The superconducting focusing coil group includes an upper focusing coil group and a lower focusing coil group, and the median plane is located between the upper focusing coil group and the lower focusing coil group. The upper focusing coil group and the lower focusing coil group each include a plurality of first focusing coils and a plurality of second focusing coils. Each of the first focusing coils has a first fan-shaped structure, and they are disposed side by side around the central axis, wherein the current directions of two adjacent first focusing coils are opposite. Each of the second focusing coils has a second fan-shaped structure and is correspondingly disposed in the first focusing coils, wherein the current directions of two adjacent second focusing coils are opposite.

In some embodiments, an isochronous cyclotron is provided. The isochronous cyclotron includes a generator, an injection tube, a cavity, an inflector, the superconducting electromagnet component as described above, an accelerating device, an outlet, and a plurality of air extraction devices. The generator is configured to generate a positively charged particle source. The injection tube is in communicate with the generator and is configured to extract, bunch, and focus the positively charged particle source to form a positively charged particle beam. The cavity is in communication with the injection tube. The inflector is disposed in the cavity and configured to bend the traveling direction of the positively charged particle beam entering the cavity. The superconducting electromagnet component is disposed in the cavity, wherein the median plane of the superconducting electromagnet component accommodates the bent positively charged particle beam. The direction of the positively charged particle beam is bent from the direction where the injection tube enters to the cavity to the central region of the median plane, and the traveling direction of the positively charged particle beam is located in the median plane. The accelerating device is disposed in the cavity and configured to resonantly accelerate the positively charged particle beam on the median plane. The outlet is provided on the cavity and is configured to spontaneously extract the resonantly accelerated positively charged particle beam from the median plane to the outside of the cavity. A plurality of air extraction devices are in communication with the injection tube and the cavity to maintain the vacuum degree.

The superconducting electromagnet component and isochronous cyclotron of the present disclosure may be applied to various types of neutron capture therapy equipment. In order to make the features and advantages of the present disclosure more comprehensible, various embodiments are specially cited below, together with the accompanying drawings, to be described in detail as follows.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
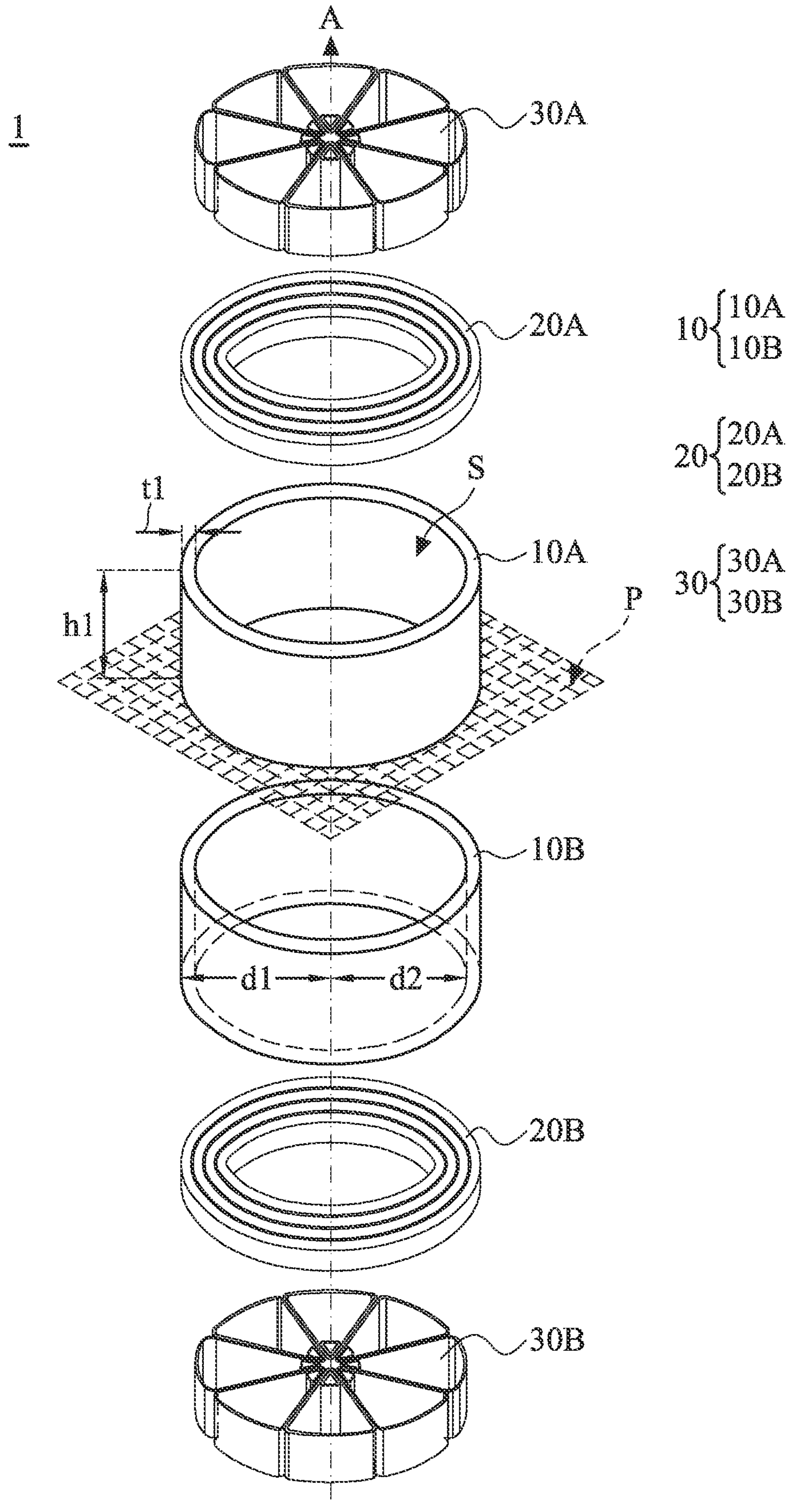
FIG. 1 is an exploded view showing the superconducting electromagnet component according to some embodiments of the present disclosure.

The following disclosure provides many different embodiments, or examples, for implementing the provided superconducting electromagnet component and the isochronous cyclotron including the same. Specific examples of features and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The directional terms mentioned herein, such as "up", "down", "left", "right" and similar terms refer to the directions in the drawings. Accordingly, the directional terms used herein are to illustrate, not to limit, the present disclosure.

In some embodiments of the present disclosure, terms about disposing and connecting, such as "disposing", "connecting" and similar terms, unless otherwise specified, may refer to two features are in direct contact with each other, or may also refer to two features are not in direct contact with each other, wherein there is an additional connect feature between the two features. The terms about disposing and connecting may also include the case where both features are movable, or both features are fixed.

In addition, ordinal numbers such as "first", "second", and the like used in the specification and claims are configured to modify different features or to distinguish different embodiments or ranges, rather than to limit the number, the upper or lower limits of features, and are not intended to limit the order of manufacture or arrangement of features.

The terms "about", "substantially", or the like used herein generally means within 10%, within 5%, within 3%, within 2%, within 1%, or within 0.5% of a given value or a given range. The value given herein is an approximate value, that is, the meaning of "about" may still be implied without the specific description of "about" or "substantially".

Unless otherwise defined, all terms including technical and scientific terms used herein have the same meaning as commonly understood by a person of ordinary skills in the art. It should be understood that these terms, such as those defined in commonly used dictionaries, should be interpreted as having meanings consistent with the relevant art and the background or context of the present disclosure, and should not be interpreted in an idealized or overly formal manner, unless otherwise defined in the embodiments of the present disclosure.

In some existing isochronous cyclotrons, hydrogen ions ($H^-$) are usually used as charged particle beams, and the charged particle beams are resonantly accelerated on the median plane of the electromagnet component by an accelerating device. When the charged particle beam is accelerated to a specific energy, the two electrons of $H^-$ may be stripped off by the carbon foil placed on the path of $H^-$ to form hydrogen ions ($H^+$). In this way, when the electrical property of the charged particle beam changes (from $H^-$ to $H^+$), the charged particle beam will be pulled by the magnetic field (from clockwise (or counterclockwise) gyration to counterclockwise (or clockwise) gyration), and thus be taken out of the cyclotron as expected path.

However, the impact by the charged particle beam with high current will rapidly heat up the carbon foil, resulting in a short service life of the carbon foil. On the other hand, when the energy (e.g., kinetic energy) of the charged particle beam is higher, the temperature of the carbon foil will be further increased, which results in a shorter service life of the carbon foil. For neutron capture therapy equipment that requires large currents, the short-life carbon foil increases the times of regular replacements of the carbon foil, thereby increasing the inconvenience and increasing the risk of damage caused by disassembly and assembly of the carbon foil. In addition, if only a lower current is used to operate the device, the development and application of the device will be limited, and the treatment time with a lower current to operate the neutron capture therapy will be longer than the treatment time with a higher current to operate the neutron capture therapy. This will not only reduce the patient's comfort during treatment but also increase the probability of accidents due to longer treatment time.

In order to solve the above problems, the present disclosure provides a superconducting electromagnet component for an isochronous cyclotron and an isochronous cyclotron including the same. Specifically, the electromagnet component consists of three types of superconducting coil without iron cores and is configured to cause the charged particle beam (for example, $H^+$) entering therein to perform an isochronous gyration motion and be spontaneously extracted under a specific kinetic energy. In this way, compared with existing cyclotrons, the isochronous cyclotron of the present disclosure (including the above-mentioned superconducting electromagnet component) does not need to control the path of the charged particle beam by a carbon foil, and it may stably generate high-current proton beams, thereby being more effectively used in neutron capture therapy equipment. On the other hand, since the superconducting coil of the present disclosure does not include iron cores, it may also have a significant lightweight effect. In some embodiments, the material of the superconducting coil without an iron core may be or may include NbTi, $Nb_3Sn$, $MgB_2$, Bi-2212, Bi-2223 (BiSrCaCuO), YBCO, combinations thereof, or other suitable materials, but the present disclosure is not limited thereto.

It should be noted that although it is mentioned above that the isochronous cyclotron of the present disclosure may be applied in neutron capture therapy equipment, the application of the present disclosure is not limited thereto. For example, the isochronous cyclotron of the present disclosure may also be applied to equipment that requires the use of proton beams with large currents, such as isotope production equipment. In order to make the present disclosure clearer and easier to understand, each component of the present disclosure will be explained in detail below.

FIGS. 1, 2, 3A, 3B, and 4 respectively show an exploded view, a perspective cross-sectional view, a top view, a partial enlarged view, and a side view of the superconducting electromagnet component according to some embodiments of the present disclosure. As shown in the figures, the superconducting electromagnet component 1 includes a superconducting main coil 10, a superconducting trim coil group 20, and a superconducting focusing coil group 30.

In some embodiments, the superconducting main coil 10 is disposed around the central axis A and forms an accommodation space S inside. The accommodation space S is used to accommodate the superconducting trim coil group 20 and the superconducting focusing coil group 30. In some embodiments, the superconducting main coil 10 may be a hollow annular wall without an iron core (i.e., coreless), and the hollow annular wall extends vertically along the central axis A. The superconducting main coil 10 includes an upper main coil 10A and a lower main coil 10B, and the upper main coil 10A and the lower main coil 10B are disposed symmetrically with each other. There is a median plane P between the upper main coil 10A and the lower main coil 10B. In some embodiments, the superconducting main coil 10 is configured to generate a primary magnetic field that is used for horizontal focusing, isochronism, cyclotron motion of the charged particle beam, and self-extraction at specific kinetic energy. The main horizontal focusing magnetic field may cause the charged particle beam to be horizontally focused vertically to the traveling direction when moving on the median plane P.

As shown in FIG. 1, in some embodiments, the outer radius d1 of the superconducting main coil 10 is between 300 mm and 600 mm, but the present disclosure is not limited thereto. For example, the outer radius d1 of the superconducting main coil 10 may be 300 mm, 360 mm, 420 mm, 480 mm, 540 mm, 570 mm, 600 mm, or any value or range of values between the above values. In some embodiments, the inner radius d2 of the superconducting main coil 10 is between 250 mm and 570 mm, but the present disclosure is not limited thereto. For example, the inner radius d2 of the superconducting main coil 10 may be 250 mm, 320 mm, 380 mm, 440 mm, 500 mm, 530 mm, 570 mm, or any value or range of values between the above values. In some embodiments, the thickness t1 of the superconducting main coil 10 is between 30 mm and 50 mm, but the present disclosure is not limited thereto. For example, the thickness t1 of the superconducting main coil 10 may be 30 mm, 35 mm, 40 mm, 45 mm, 50 mm, or any value or range of values between the above values.

Figure 2:
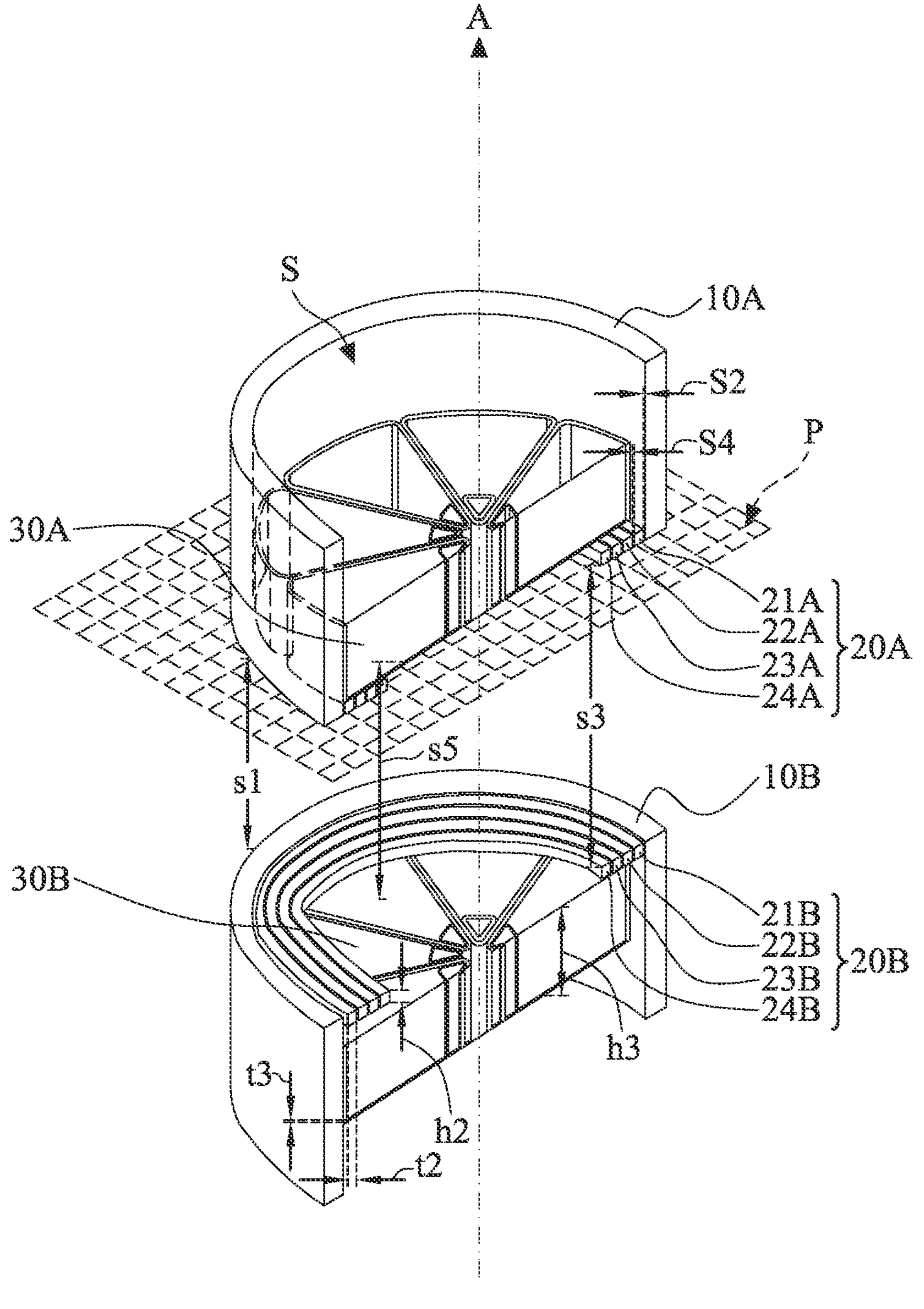
FIG. 2 is a perspective cross-sectional view showing the superconducting electromagnet component according to some embodiments of the present disclosure.
Figure 4:
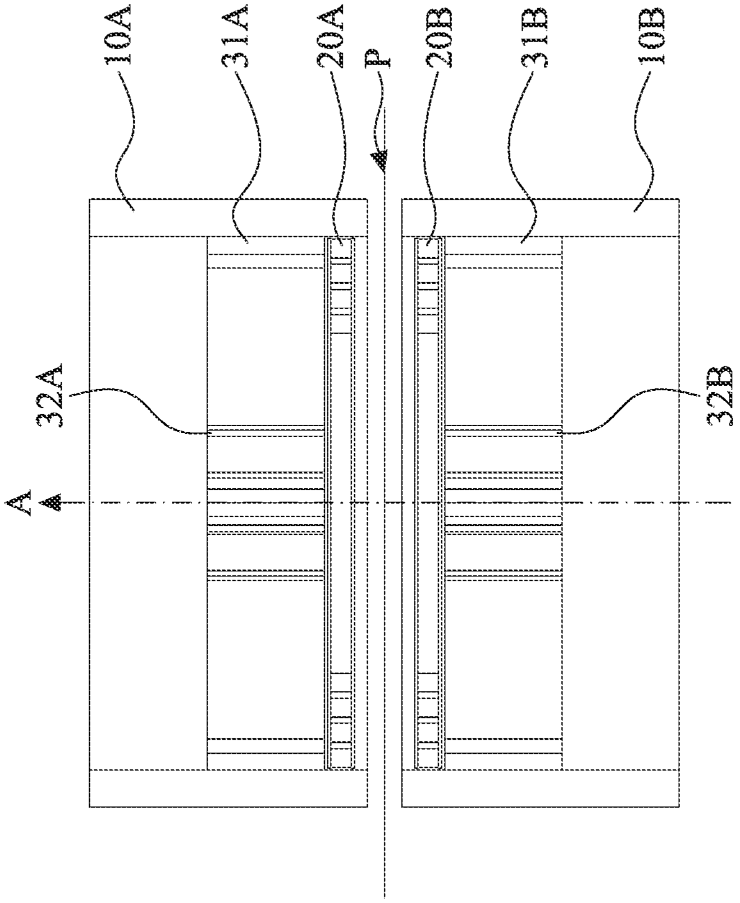
FIG. 4 is a side view showing the superconducting electromagnet component according to some embodiments of the present disclosure.

In some embodiments, the height h1 of the upper main coil 10A or the lower main coil 10B is between 200 mm and 500 mm, but the present disclosure is not limited thereto. For example, the height h1 of the upper main coil 10A or the lower main coil 10B may be 200 mm, 300 mm, 320 mm, 340 mm, 360 mm, 380 mm, 400 mm, 500 mm, or any value or range of values between the above values. As shown in FIG. 2, in some embodiments, the vertical spacing s1 between the upper main coil 10A and the lower main coil 10B (in the assembled state) is between 20 mm and 200 mm, but the present disclosure is not limited thereto. For example, the vertical spacing s1 between the upper main coil 10A and the lower main coil 10B may be 20 mm, 40 mm, 60 mm, 100 mm, 150 mm, 200 mm, or any value or range of values between the above values. Half of the vertical distance s1 is the distance between the upper main coil 10A and the middle plane P or the lower main coil 10B and the middle plane P, as shown in FIG. 4.

In some embodiments, the superconducting trim coil group 20 is disposed in the accommodation space S of the superconducting main coil 10 around the central axis A. In some embodiments, similar to the superconducting main coil 10, the superconducting trim coil group 20 may be a hollow annular pillar without an iron core (coreless), and the hollow annular pillar is surrounded by the inner wall of the superconducting main coil 10. As shown in FIG. 2, in some embodiments, the horizontal spacing s2 between the superconducting trim coil group 20 and the superconducting main coil 10 is between 0 mm and 100 mm, but the present disclosure is not limited thereto. For example, the horizontal spacing s2 between the superconducting trim coil group 20 and the superconducting main coil 10 may be 0 mm, 5 mm, 10 mm, 15 mm, 20 mm, 50 mm, 100 mm, or any value or range of values between the above values.

In some embodiments, the superconducting trim coil group 20 includes an upper trim coil group 20A and a lower trim coil group 20B, and the upper trim coil group 20A and the lower trim coil group 20B are disposed symmetrically with each other. The median plane P is located between the upper trim coil group 20A and the lower trim coil group 20B. In some embodiments, the superconducting trim coil group 20 is configured to generate the required magnetic field for finely tuned isochronous property and spontaneous extraction at specific kinetic energy. The magnetic field of the trim coil that is used for fine-tuning, in conjunction with the main coil magnetic field, enables the charged particle beam to be accelerated to a specific kinetic energy on the median plane P more stably and spontaneously extracted. As shown in FIG. 2, in some embodiments, the vertical spacing s3 between the upper trim coil group 20A and the lower trim coil group 20B is between 20 mm and 200 mm, but the present disclosure is not limited thereto. For example, the vertical spacing s3 between the upper trim coil group 20A and the lower trim coil group 20B may be 20 mm, 40 mm, 60 mm, 80 mm, 100 mm, 200 mm, or any value or range of values between the above values. Half of the vertical spacing s3 is the space between the upper trim coil group 20A and the middle plane P or the lower trim coil group 20B and the middle plane P, as shown in FIG. 4.

As shown in FIG. 2, in some embodiments, the upper trim coil group 20A includes four sub-trim coils 21A to 24A, and the lower trim coil group 20B includes four sub-trim coils 21B to 24B. The sub-trim coils 21A to 24A are sequentially disposed in the upper main coil 10A along the central axis A, and the sub-trim coils 21B to 24B are sequentially disposed in the lower main coil 10B along the central axis A. However, the present disclosure is not limited to the number of sub-trim coils mentioned above. In other embodiments, the number of sub-trim coils may be adjusted as needed. For example, the number of sub-trim coils included in the upper trim coil group 20A may be three, five, or more, and the number of sub-trim coils included in the lower trim coil group 20B may be three, five, or more. In some embodiments, the horizontal spacing s4 between two adjacent sub-trim coils 21A to 24A and 21B to 24B is between 1.0 mm and 50 mm, but the present disclosure is not limited thereto. For example, the horizontal spacing s4 between two adjacent sub-trim coils 21A to 24A and 21B to 24B may be 1.0 mm, 5 mm, 10 mm, 15 mm, 20 mm, 50 mm, or any value or range of values between the above values.

As shown in FIG. 2, in some embodiments, the thickness t2 of the sub-trim coils 21A to 24A and 21B to 24B is between 10 mm and 50 mm, but the present disclosure is not limited thereto. For example, the thickness t2 of the sub-trim coils 21A to 24A and 21B to 24B may be 10 mm, 20 mm, 25 mm, 30 mm, 35 mm, 40 mm, 50 mm, or any value or range of values between the above values. In some embodiments, the height h2 of the sub-trim coils 21A to 24A and 21B to 24B is between 10 mm and 50 mm, but the present disclosure is not limited thereto. For example, the height h2 of the sub-trim coils 21A to 24A and 21B to 24B may be 10 mm, 20 mm, 25 mm, 30 mm, 35 mm, 40 mm, 50 mm, or any value or range of values between the above values. It should be noted that the sub-trim coils 21A to 24A and 21B to 24B may each have a different thickness t2, height h2, or horizontal spacing s4, and are not limited to being the same as each other.

In some embodiments, the superconducting focusing coil group 30 is disposed on a side of the superconducting trim coil group 20 away from the median plane P. The superconducting focusing coil group 30 includes an upper focusing coil group 30A and a lower focusing coil group 30B, and the upper focusing coil group 30A and the lower focusing coil group 30B are disposed symmetrically with each other. The median plane P is located between the upper focusing coil group 30A and the lower focusing coil group 30B. In some embodiments, the superconducting focusing coil group 30 is configured to generate a vertical focusing magnetic field that vertically focuses the charged particle beam on the median plane P. As shown in FIG. 2, in some embodiments, the vertical spacing s5 between the upper focusing coil group 30A and the lower focusing coil group 30B is between 40 mm and 300 mm, but the present disclosure is not limited thereto. For example, the vertical spacing s5 between the upper focusing coil group 30A and the lower focusing coil group 30B may be 40 mm, 75 mm, 100 mm, 125 mm, 300 mm, or any value or range of values between the above values. Half of the vertical distance s5 is the distance between the upper focusing coil group 30A and the middle plane P or the lower focusing coil group 30B and the middle plane P, as shown in FIG. 4.

Figure 3A:
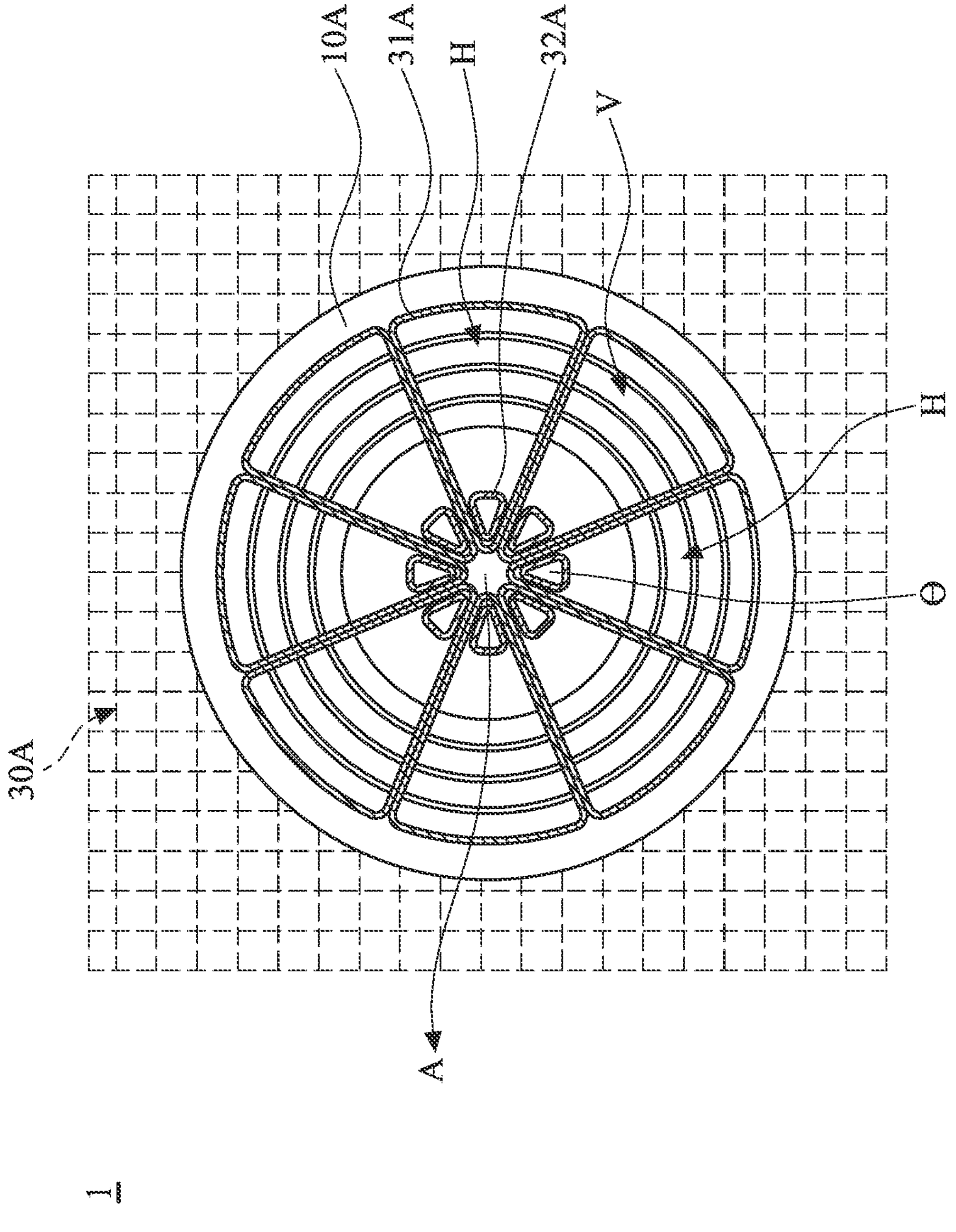
FIG. 3A is a top view showing the superconducting electromagnet component according to some embodiments of the present disclosure.

As shown in FIG. 3A, in some embodiments, the upper focusing coil group 30A includes a plurality of first focusing coils 31A and a plurality of second focusing coils 32A. Each first focusing coil 31A has a first fan-shaped structure and is disposed side by side around the central axis A, wherein the current directions of two adjacent first focusing coils 31A are opposite. In other words, the magnetic fields formed by two adjacent first focusing coils 31A have different magnetic field intensities.

In addition, each second focusing coil 32A has a second fan-shaped structure. The size of the first fan-shaped structure of the first focusing coil 31A is larger than the size of the second fan-shaped structure of the second focusing coil 32A. In some embodiments, each second focusing coil 32A is disposed correspondingly in each first focusing coil 31A, wherein the current directions of two adjacent second focusing coils 32A are opposite. In other words, the magnetic fields formed by two adjacent second focusing coils 32A have different magnetic field intensities.

In some embodiments, each first focusing coil 31A and the second focusing coil 32A therein are configured to provide a vertical focusing magnetic field near the outer region and a vertical focusing magnetic field near the inner region, respectively. It should be noted that the current directions of each group of first focusing coils 31A and the second focusing coil 32A therein are the same, and the current directions of each group of first focusing coils 31A and the second focusing coils 32A therein are different from the current direction of another adjacent group of first focusing coils 31A and the second focusing coil 32A therein. In some embodiments, the area with high magnetic field intensity on the median plane P corresponding to the first focusing coil 31A and the second focusing coil 32A therein may be referred to as a hill H, and the area with low magnetic field intensity on the median plane P corresponding to the first focusing coil 31A and the second focusing coil 32A therein may be referred to as a valley V. In some embodiments, the difference in magnetic field intensity between the hill value and the valley value on the median plane P is between 0.1 T and 5.4 T, but the present disclosure is not limited thereto. For example, the magnetic field intensity difference may be 0.1 T, 0.5 T, 1.0 T, 1.5 T, 2.0 T, 2.7 T, 5.4 T, or any value or range of values between the above values.

Similar to the upper focusing coil group 30A, the lower focusing coil group 30B also includes a plurality of first focusing coils 31B and a plurality of second focusing coils 32B. The structure and arrangement of the first focusing coil 31B are similar to the first focusing coil 31A, and the structure and arrangement of the second focusing coil 32B are similar to the second focusing coil 32A, therefore the descriptions are omitted here. In some embodiments, the focusing coil group 30 only consists of the first focusing coils 31A, 31B and the second focusing coils 32A, 32B, and does not include other groups of focusing coils. By arranging two sets of focusing coils with fan-shaped structures of different sizes and closely disposed side by side, the charged particle beam may be vertically focused on the median plane P more stably and accurately.

As shown in FIG. 3A, in some embodiments, the central angle θ of each of the first focusing coils 31A and 31B and the second focusing coils 32A and 32B is 45°. In other words, the number of each of the first focusing coils 31A and 31B and the second focusing coils 32A and 32B is eight, and they are disposed side by side around the central axis A. It should be noted that although the central angle θ is defined as 45° above, in order to prevent these focusing coils from being too closely disposed and in contact, the central angle θ may be slightly smaller than 45°, such as 44°, 43°, 42°, 41°, or 40°. In some embodiments, the horizontal spacing s6 between the first focusing coil 31A and the second focusing coil 32A or the first focusing coil 31B and the second focusing coil 32B is between 0.0 mm and 20 mm, but the present disclosure is not limited thereto. For example, the horizontal spacing s6 between the first focusing coil 31A and the second focusing coil 32A or the first focusing coil 31B and the second focusing coil 32B may be 0.0 mm, 5 mm, 10 mm, 20 mm, or any value or range of values between the above values.

Figure 3B:
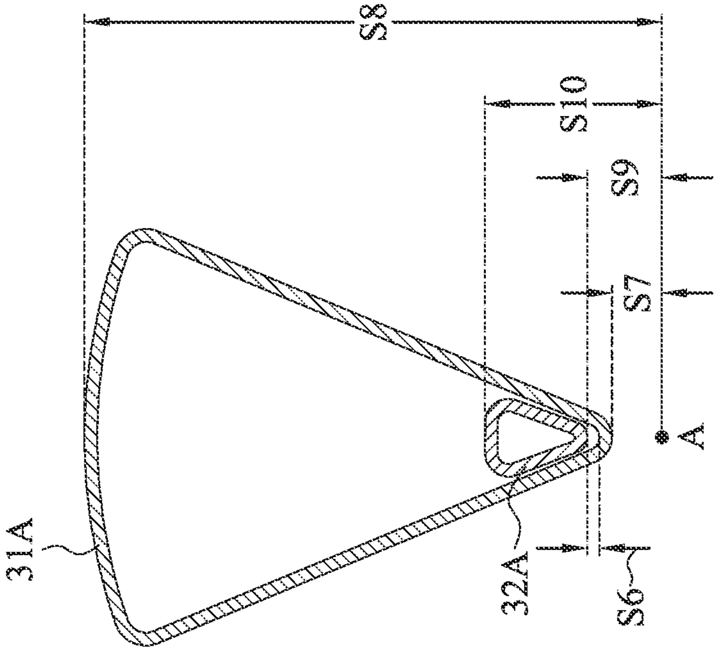
FIG. 3B is a partial enlarged view of the superconducting electromagnet component according to some embodiments of the present disclosure.

As shown in FIG. 3B, in some embodiments, the shortest horizontal spacing s7 between each first focusing coil 31A, 31B and the central axis A is 15 mm to 100 mm, and the longest horizontal spacing s8 is 250 mm to 570 mm, but the present disclosure is not limited thereto. For example, the shortest horizontal spacing s7 may be 15 mm, 25 mm, 50 mm, 100 mm, or any value or range of values between the above values, and the longest horizontal spacing s8 may be 250 mm, 350 mm, 400 mm, 450 mm, 500 mm, 570 mm, or any value or range of values between the above values. In some embodiments, the shortest horizontal spacing s9 between each second focusing coil 32A, 32B and the central axis A is 17 mm to 150 mm, and the longest horizontal spacing s10 is 80 mm to 200 mm, but the present disclosure is not limited thereto. For example, the shortest horizontal spacing s9 may be 17 mm, 50 mm, 100 mm, 150 mm, or any value or range of values between the above values, and the longest horizontal spacing s10 may be 80 mm, 90 mm, 100 mm, 110 mm, 120 mm, 200 mm, or any value or range of values between the above values.

As shown in FIG. 2, in some embodiments, the thickness t3 of the first focusing coils 31A, 31B and the second focusing coils 32A, 32B is between 2 mm and 20 mm, but the present disclosure is not limited thereto. For example, the thickness t3 of the first focusing coils 31A, 31B and the second focusing coils 32A, 32B may be 2 mm, 5 mm, 10 mm, 20 mm, or any value or range of values between the above values. In some embodiments, the height h3 of the first focusing coils 31A, 31B and the second focusing coils 32A, 32B is between 50 mm and 300 mm, but the present disclosure is not limited thereto. For example, the height h3 of the first focusing coils 31A, 31B and the second focusing coils 32A, 32B may be 50 mm, 100 mm, 150 mm, 200 mm, 300 mm, or any value or range of values between the above values.

As mentioned above, the present disclosure effectively enables the charged particle beam on the median plane P to have isochronous and spontaneous extraction effects by providing a superconducting electromagnet component having the above components. In some embodiments, the average magnetic field intensity experienced by the charged particle beam on the median plane P is about 1.4 T to 2.7 T, but the present disclosure is not limited thereto. For example, the average magnetic field intensity experienced by the charged particle beam on the median plane P may be about 1.4 T, 1.8 T, 2.2 T, 2.7 T, or any value or range of values between the above values. In some embodiments, the extracted kinetic energy of the charged particle beam on the median plane P is between 5 MeV and 35 MeV, but the present disclosure is not limited thereto. For example, the extracted kinetic energy of the charged particle beam on the median plane P may be 5 MeV, 10 MeV, 20 MeV, 35 MeV, or any value or range of values between the above values. In some embodiments, the extraction kinetic energy of the charged particle beam on the median plane P may be 30 MeV, so that it may be preferably used in neutron capture therapy equipment. It should be noted that in the present disclosure, the charged particles are all $H^+$.

Figure 5:
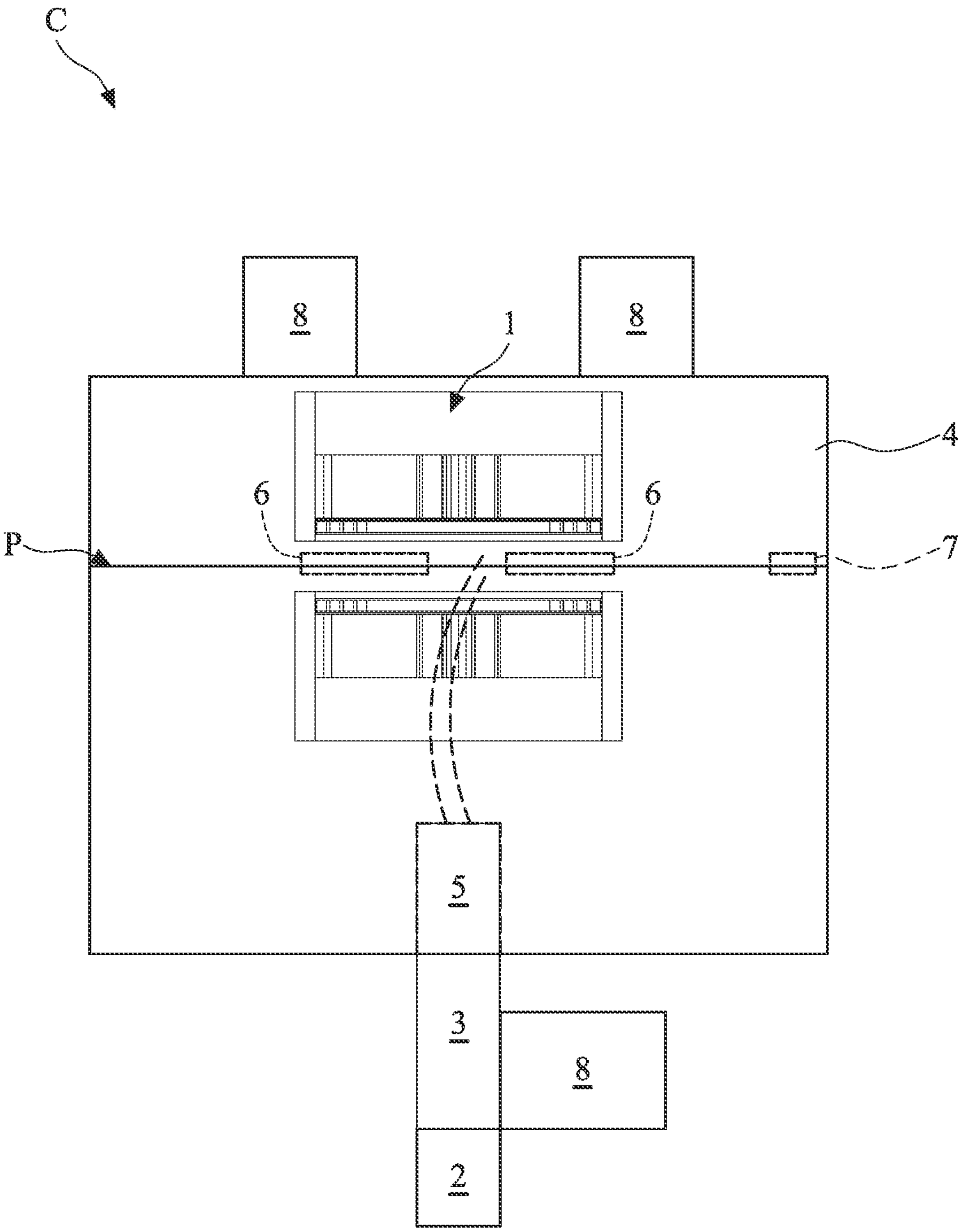
FIG. 5 is a schematic diagram showing the isochronous cyclotron according to some embodiments of the present disclosure.

FIG. 5 is a schematic diagram showing the isochronous cyclotron according to some embodiments of the present disclosure. As shown in the figure, the isochronous cyclotron C includes a generator 2, an injection tube 3, a cavity 4, an inflector 5, the above-mentioned superconducting electromagnet component 1, an accelerating device 6, an outlet 7, and a plurality of air extraction devices 8. The generator 2 is configured to generate a positively charged particle source (e.g., $H^+$). In some embodiments, the generator 2 may generate $H^+$, $H^-$, or other possible particles, but the present disclosure is not limited thereto. The injection tube 3 is in communication with the generator 2 and is configured to extract, bunch, and focus the positively charged particle source (e.g., $H^+$) to form a positively charged particle beam (e.g., $H^+$). In some embodiments, the injection tube 3 may introduce only $H^+$ into the cavity and exclude other kinds of particles (e.g., $H^-$).

The cavity 4 is in communication with the injection tube 3 and is used to accommodate the inflector 5, the superconducting electromagnet component 1, and the accelerating device 6. The inflector 5 is disposed in the cavity 4 and is configured to bend the traveling direction of the positively charged particle beam entering the cavity 4 to make the positively charged particle beam enter the median plane P in the electromagnet component 1. The electromagnet component 1 is disposed in the cavity 4, wherein the median plane P of the electromagnet component 1 accommodates the bent positively charged particle beam. Detailed features of the electromagnet component 1 may be referred to above and the descriptions thereof are omitted. The accelerating device 6 is disposed in the cavity and is configured to resonantly accelerate the positively charged particle beam on the median plane P (for example, using radio frequency (RF)). The outlet 7 is disposed on the cavity 4 and is configured to extract the resonantly accelerated positively charged particle beam from the median plane P to the outside of the cavity. The air extraction devices 8 are in fluid communication with the injection tube 3 and the cavity 4 and are configured to maintain the vacuum inside the cavity 4. Compared with existing devices, the isochronous cyclotron C of the present disclosure does not use as the charged particle beam, and therefore does not need to provide a carbon foil for stripping electrons on the path of the charged particle beam. In this way, without stripping electrons by the carbon foil to change the path of charged particles, the cyclotron of the present disclosure is not limited by the lifetime limit of the carbon foil, and thus can achieve the effect of outputting a proton beam with high energy at a large current.

Figure 6:
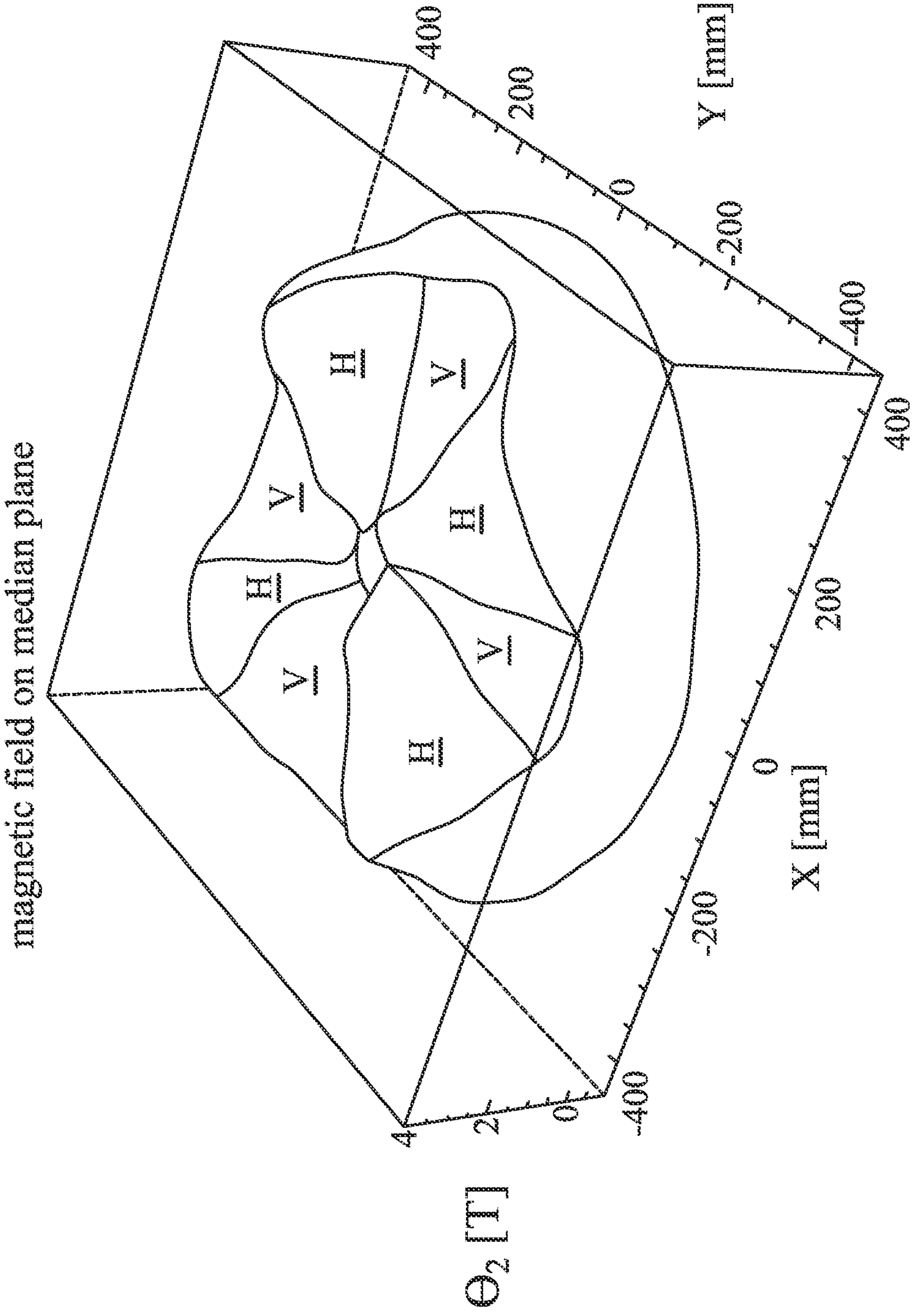
FIG. 6 is a schematic diagram showing the magnetic field formed on the median plane of the isochronous cyclotron including the superconducting electromagnet component according to some embodiments of the present disclosure.
Figure 7:
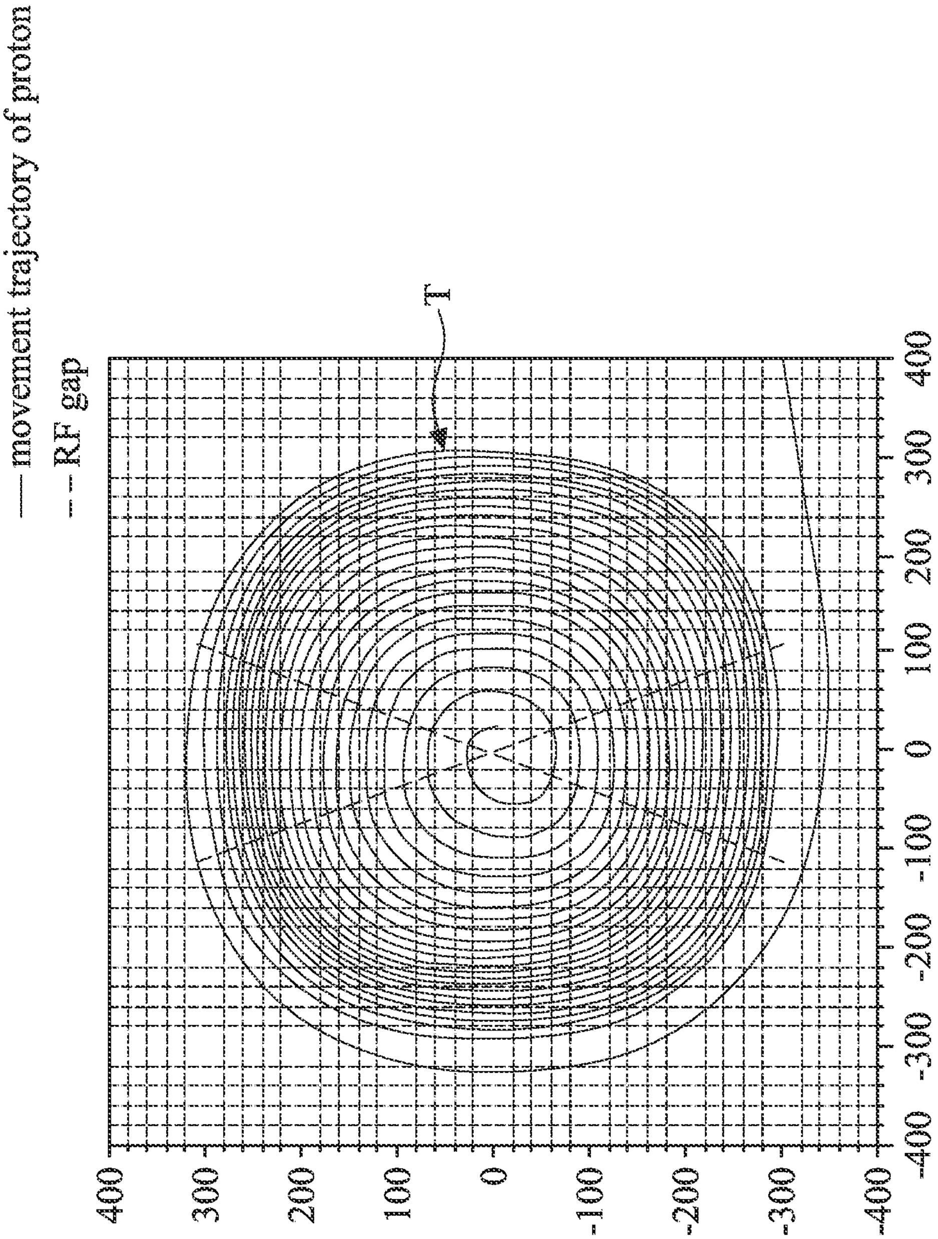
FIG. 7 shows the movement trajectory of charged particles on the median plane of the isochronous cyclotron including the superconducting electromagnet component according to some embodiments of the present disclosure.

FIGS. 6 to 7 respectively illustrate the magnetic field formed on the median plane of an isochronous cyclotron including a superconducting electromagnet component and the movement trajectories of charged particles according to some embodiments of the present disclosure. In the following, an example of the present disclosure will be provided for reference. As shown in Table 1 below, it is the dimensional parameters of each component of the superconducting electromagnet component 1 of the example.

TABLE 1

| Feature | Item | Parameter |
|---|---|---|
| superconducting main coil 10 | outer radius d1 | 384 mm |
| | inner radius d2 | 344 mm |
| | thickness t1 | 40 mm |
| | height h1 | 350 mm |
| | vertical spacing s1 | 40 mm |
| superconducting trim coil group 20 | number of sub-trim coils | 4 |
| | horizontal spacing s2 | 10 mm |
| | vertical spacing s3 | 80 mm |
| | horizontal spacing s4 | 10 mm |
| | thickness t2 | 30 mm |
| | height h2 | 30 mm |
| superconducting focusing coil group 30 | types of fan-shaped structures | 2 types |
| | number of magnetic field segments (peak and valley areas) | 4 |
| | central angle θ | 45° |
| | vertical spacing s5 | 150 mm |
| | horizontal spacing s6 | 0 mm |
| | thickness t3 | 5 mm |
| | height h3 | 150 mm |
| | minimum horizontal spacing s7 | 25 mm |
| | maximum horizontal spacing s8 | 339 mm |
| | minimum horizontal spacing s9 | 30 mm |
| | maximum horizontal spacing s10 | 100 mm |

As shown in Table 2 below, it is the current parameters of each component of the superconducting electromagnet component 1 of the example.

TABLE 2

| Feature | Unit | Parameter |
|---|---|---|
| first focusing coils 31a, 31b | 1e6 A*turns | 0.5000 |
| second focusing coils 32a, 32b | 1e6 A*turns | 6.070 |

TABLE 2-continued

| Feature | Unit | Parameter |
|---|---|---|
| superconducting main coil 10 | 1e6 A*turns | 1.14570 |
| sub-trim coils 21a, 21b | 1e3 A*turns | −36.0 |
| sub-trim coils 22a, 22b | 1e3 A*turns | −12.1 |
| sub-trim coils 23a, 23b | 1e3 A*turns | −6.7 |
| sub-trim coils 24a, 24b | 1e3 A*turns | 0.1 |

As shown in Table 3 below, it is the test results of the example.

TABLE 3

| Parameter | Unit | Value |
|---|---|---|
| initial energy of charged particles | keV | 194 |
| initial gyration radius of charged particles | mm | 26 |
| $dE_{max}$ | MeV | 1.4 |
| energy of extraction | MeV | 29.4 |

As shown in FIG. 6, based on the above-mentioned superconducting electromagnet component, the magnetic field formed by the device of the present disclosure consists of alternating peak areas H and valley areas V, which can stably focus charged particles on the median plane P. As shown in the motion trajectory T in FIG. 7, after being pulled by the accelerator, the charged particles experienced multiple isochronous loops on the median plane P, and the spontaneous extraction is achieved and the extraction energy is 29.4 MeV. Therefore, the device of the present disclosure may be effectively used in neutron capture therapy equipment, other isotope production equipment, or other devices suitable for extracting energy.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A superconducting electromagnet component of an isochronous cyclotron, comprising:

a superconducting main coil disposed around a central axis, wherein the superconducting main coil comprises an upper main coil and a lower main coil, and there is a median plane between the upper main coil and the lower main coil;

a superconducting trim coil group disposed in the superconducting main coil around the central axis, wherein the superconducting trim coil group comprises an upper trim coil group and a lower trim coil group, and the median plane is located between the upper trim coil group and the lower trim coil group; and a superconducting focusing coil group disposed on a side of the superconducting trim coil group away from the median plane, wherein the superconducting focusing coil group comprises an upper focusing coil group and a lower focusing coil group, and the median plane is located between the upper focusing coil group and the lower focusing coil group, wherein the upper focusing coil group and the lower focusing coil group each include:

a plurality of first focusing coils each having a first fan-shaped structure and disposed side by side around the central axis, wherein current directions of two adjacent first focusing coils are opposite; and a plurality of second focusing coils each having a second fan-shaped structure and correspondingly disposed in the plurality of first focusing coils, wherein current directions of two adjacent second focusing coils are opposite.

2. The superconducting electromagnet component of the isochronous cyclotron as claimed in claim 1, wherein an outer radius of the superconducting main coil is between 300 mm and 600 mm.

3. The superconducting electromagnet component of the isochronous cyclotron as claimed in claim 1, wherein a thickness of the superconducting main coil is between 30 mm and 50 mm.

4. The superconducting electromagnet component of the isochronous cyclotron as claimed in claim 1, wherein a height of the upper main coil or the lower main coil is between 200 mm and 500 mm.

5. The superconducting electromagnet component of the isochronous cyclotron as claimed in claim 1, wherein a vertical space between the upper main coil and the lower main coil is between 20 mm and 200 mm.

6. The superconducting electromagnet component of the isochronous cyclotron as claimed in claim 1, wherein the upper trim coil group and the lower trim coil group each comprise four sub-trim coils, and the four sub-trim coils are disposed sequentially around the superconducting main coil along the central axis.

7. The superconducting electromagnet component of the isochronous cyclotron as claimed in claim 6, wherein a thickness of the sub-trim coil is between 10 mm and 50 mm.

8. The superconducting electromagnet component of the isochronous cyclotron as claimed in claim 6, wherein a height of the sub-trim coil is between 10 mm and 50 mm.

9. The superconducting electromagnet component of the isochronous cyclotron as claimed in claim 1, wherein a vertical space between the upper trim coil group and the lower trim coil group is between 20 mm and 200 mm.

10. The superconducting electromagnet component of the isochronous cyclotron as claimed in claim 1, wherein central angles of the plurality of first focusing coils and the plurality of second focusing coils are 45°.

11. The superconducting electromagnet component of the isochronous cyclotron as claimed in claim 1, wherein the superconducting focusing coil group consists of the plurality of first focusing coils and the plurality of second focusing coils, and a size of the first fan-shaped structure of the plurality of first focusing coils is larger than a size of the second fan-shaped structure of the plurality of second focusing coils.

12. The superconducting electromagnet component of the isochronous cyclotron as claimed in claim 11, wherein a shortest horizontal space between each of the first focusing coils and the central axis is 15 mm to 100 mm, and a longest horizontal spacing is 250 mm to 570 mm, wherein a shortest horizontal space between each of the second focusing coils and the central axis is 17 mm to 150 mm, and a longest horizontal spacing is 80 mm to 200 mm.

13. The superconducting electromagnet component of the isochronous cyclotron as claimed in claim 1, wherein each first focusing coil and each second focusing coil has a thickness of 2 mm to 20 mm.

14. The superconducting electromagnet component of the isochronous cyclotron as claimed in claim 1, wherein each first focusing coil and each second focusing coil has a height of 100 mm to 200 mm.

15. The superconducting electromagnet component of the isochronous cyclotron as claimed in claim 1, wherein there is a difference in magnetic field intensity between each first focusing coil and the adjacent second focusing coil on the median plane of between 0.1 T and 5.4 T.

16. The superconducting electromagnet component of the isochronous cyclotron as claimed in claim 1, wherein a magnetic field intensity received by a charged particle beam on the median plane is 1.4 T to 2.7 T.

17. The superconducting electromagnet component of the isochronous cyclotron as claimed in claim 1, wherein an extracted kinetic energy of a charged particle beam on the median plane is between 5 MeV and 35 MeV.

18. The superconducting electromagnet component of the isochronous cyclotron as claimed in claim 1, wherein the superconducting main coil, the superconducting trim coil group, and the superconducting focusing coil group each is a superconducting coil without an iron core.

19. The superconducting electromagnet component of the isochronous cyclotron as claimed in claim 18, wherein materials of the superconducting coils without an iron core comprise NbTi, $Nb_3Sn$, $MgB_2$, Bi-2212, Bi-2223 (BiSrCaCuO), or YBCO.

20. An isochronous cyclotron, comprising:

a generator configured to generate a positively charged particle source;

an injection tube in communication with the generator and configured to extract, bunch, and focus the positively charged particle source to form a positively charged particle beam;

a cavity in communication with the injection tube;

an inflector disposed in the cavity and configured to bend a traveling direction of the positively charged particle beam entering the cavity;

the superconducting electromagnet component as claimed in claim 1 disposed in the cavity, wherein the median plane of the superconducting electromagnet component accommodates the bent positively charged particle beam;

an accelerating device disposed in the cavity and configured to resonantly accelerate the positively charged particle beam on the median plane;

an outlet disposed on the cavity and configured to lead the resonantly accelerated positively charged particle beam from the median plane to outside of the cavity; and a plurality of air extraction devices in fluid communication with the injection tube and the cavity.

21. The isochronous cyclotron as claimed in claim 20, wherein the positively charged particle source is $H^+$.

* * * * *